United States Patent [19]

Smith

[11] Patent Number: 5,748,824
[45] Date of Patent: May 5, 1998

[54] POSITIVE DISPERSION OPTICAL WAVEGUIDE

[75] Inventor: David K. Smith, Painted Post, N.Y.

[73] Assignee: Corning Incorporated

[21] Appl. No.: 559,954

[22] Filed: Nov. 17, 1995

[51] Int. Cl.$^6$ .................................................. G02B 6/22
[52] U.S. Cl. ........................................ 385/124; 385/126
[58] Field of Search ................................... 385/123, 124, 385/125, 126, 127, 128

[56] References Cited

U.S. PATENT DOCUMENTS

| | | | |
|---|---|---|---|
| 4,641,917 | 2/1987 | Glodis et al. | 385/127 |
| 4,715,679 | 12/1987 | Bhagavatula | 385/127 |
| 5,261,016 | 11/1993 | Poole | 385/28 |
| 5,483,612 | 1/1996 | Gallagher et al. | 385/127 |

Primary Examiner—Phan T. H. Palmer
Attorney, Agent, or Firm—William J. Chervenak

[57] ABSTRACT

A single mode optical waveguide fiber having a positive total dispersion is disclosed. The novel waveguide fiber has a core region comprising three distinct segments. Studies of this novel waveguide, wherein properties are calculated as various ones of the core region parameters are changed, show that the waveguide satisfies the requirements of a fiber in a high bit rate, long regenerator spacing system. The novel waveguide design is relatively simple to manufacture and maintains its functional properties at tight tolerances when the core region parameters are varied over a prescribed range. This high performance waveguide limits self phase modulation and four wave mixing, facilitates wavelength division multiplexing, and is compatible with optical amplifiers.

8 Claims, 7 Drawing Sheets

POSITIVE DISPERSION OPTICAL WAVEGUIDE

BACKGROUND OF THE INVENTION

The invention is directed to a single mode optical waveguide fiber wherein the total dispersion is maintained positive over the entire fiber length. The dispersion sign convention generally used in the art is, the dispersion of a waveguide is denoted as positive, if, in the waveguide, a shorter wavelength signal travels at higher speed than a longer wavelength signal.

Because of the high data rates and the need for long regenerator spacing, the search for high performance optical waveguide fibers designed for long distance, high bit rate telecommunications has intensified. An additional requirement is that the waveguide fiber be compatible with optical amplifiers, which typically show an optimum gain curve in the wavelength range 1530 nm to 1570 nm.

In cases where waveguide information capacity is increased by means of wavelength division multiplexing (WDM) technology, an additional waveguide fiber property becomes important. For WDM, high bit rate systems, it is necessary for the waveguide to have exceptionally low, but non-zero, total dispersion, thereby limiting the non-linear dispersion effect of four wave mixing.

Another non-linear effect which can produce unacceptable dispersion in systems having a high power density, i.e., a high power per unit area, is self phase modulation. Self phase modulation may be controlled by designing a waveguide core which has a large effective area, thereby reducing the power density. An alternative approach is to control the sign of the total dispersion of the waveguide so that the total dispersion of the waveguide serves to counteract the dispersive effect of self phase modulation.

A waveguide having a positive dispersion, where positive means short wavelength signals travel at higher speed than those of longer wavelength, will produce a dispersion effect opposite that of self phase modulation, thereby substantially eliminating self phase modulation dispersion.

Thus there is a need for an optical waveguide fiber which:
- is single mode over the wavelength range 1530 nm to 1570 nm;
- has a zero dispersion wavelength outside the range 1530 nm to 1570 nm;
- has a small, positive total dispersion over the wavelength range 1530 nm to 1570 nm; and,
- retains the usual high performance waveguide characteristics such as high strength, low attenuation and resistance to bend induced loss.

From the cost and process point of view, ease of manufacture and insensitivity of waveguide properties to process variations are also highly desirable properties.

The concept of adding structure to the waveguide fiber core by means of core segments, having distinct profiles to provide flexibility in waveguide fiber design, is described fully in U.S. Pat. No. 4 715,679, Bhagavatula. The segmented core concept can be used to achieve unusual combinations of waveguide fiber properties, such as those described herein.

DEFINITIONS

The following definitions are in accord with common usage in the art.

The terms refractive index profile and index profile are used interchangeably.

The radii of the regions of the core are defined in terms of the index of refraction.

A particular region begins at the point where the refractive index characteristic of that region begins and ends at the last point where the refractive index is characteristic of that region. Radius will have this definition unless otherwise noted in the text.

The core preform diameter is the overall core region dimension prior to drawing the draw preform to the final waveguide fiber diameter. The term does not in any way limit the novel profile to a specific waveguide manufacturing process or imply that a particular process is superior to others in manufacturing a waveguide having the novel profile.

The initials WDM represent wavelength division multiplexing.

The initials SPM represent self phase modulation, a non-linear optical phenomenon wherein a signal having a power density above a specific power level will travel at a different speed in the waveguide relative to a signal below that power density. SPM causes signal dispersion comparable to that of linear dispersion having a negative sign.

The initials FWM represent four wave mixing, the phenomenon wherein two or more signals in a waveguide interfere to produce signals of different frequencies.

The term, % $\Delta_i$, represents a relative measure of refractive index defined by the equation, $$\% \Delta_i = 100 \times (n_i^2 - n_c^2)/2n_i^2,$$

where $n_i$ is the maximum refractive index in region i, unless otherwise specified, and $n_c$ is the refractive index in the cladding region For the refractive index profiles disclosed and describes herein, the second core segment index $\Delta\%$, i.e., $\Delta_2\%$, refers to the minimum refractive index in that core region.

The term alpha profile refers to a refractive index profile, expressed in terms of % delta(r), which follows the equation, $$\% delta(r) = \% delta(r_o)(1 - [(r-r_o)/(r_1-r_o)]^{alpha}),$$

where r is in the range $r_o \leq r \leq r_1$, delta is defined above, and alpha is an exponent which defines the profile shape.

The pin array bend test is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. The waveguide fiber is caused to pass on opposite sides of adjacent pins as shown in FIG. 4. During testing, the waveguide fiber is placed under a tension just sufficient to make the waveguide conform to a portion of the periphery of the pins.

SUMMARY OF THE INVENTION

A family of waveguide fibers has been discovered which meet the high performance requirements outlined above. The novel optical waveguide fiber is characterized by a segmented core, i.e., a core region which has at least two distinct segments, each segment having a particular refractive index profile as described in U.S. patent application Ser. No. 08/323,795, now U.S. Pat. No. 5,483,612.

A first aspect of the novel waveguide fiber is characterized by a core region having three segments. Each segment is described in terms of its maximum refractive index, $n_i$, i=1,2,3, its radius, $r_i$, measured from the longitudinal symmetry axis of the waveguide, and its refractive index difference, $\Delta_i$, defined relative to the clad index $n_c$. The radii are defined in the detailed description section of this specification.

In addition, each segment has a characteristic refractive index profile. The novel three segment core waveguide fiber has, for the first central segment of the core, an alpha profile, where alpha=1. The index difference, $\Delta_1\%$ is $\leq 0.90\%$. The second segment, is an annular ring adjacent to and surrounding the central segment. The annular ring is substantially flat and has $\Delta_2\% \leq 0.024\%$. The third core segment surrounds and is adjacent to the second segment. The third segment has a profile in the shape of a rounded step. The refractive index difference is $\Delta_3\% \leq 0.20\%$. As can be seen from the values of $\Delta_i\%$, the maximum refractive index $n_i$ of each segment is set so that $n_1 > n_3 > n_2 \geq n \geq n_c$, where $n_c$ is the clad refractive-index.

Given this three segment core having the profile shapes as described and the $\Delta_i\%$ stated, it is possible to find numerous sets of radii, $r_1$, $r_2$, and $r_3$, which provide a waveguide fiber having the properties:

zero dispersion wavelength, $\lambda_o$, $\leq 1530$ nm;

total dispersion slope<0.065 ps/nm$^2$-km over the range 1530 nm to 1570 nm;

pin array bend loss$\geq 12$ dB;

mode field diameter$\leq 7.4$ microns;

cut off wavelength (measured on the fiber), $\lambda_c < 1450$ nm; and, total dispersion which is positive and has a magnitude in the range of about 0.50 to 3.0 ps/nm-km over the wavelength range 1530 nm to 1570 nm.

The novel profiles have $\Delta$'s which may generally be described, $\Delta_1\%$ in the range of about 0.57% to 0.90%, $\Delta_2\%$ in the range of about 0 to 0.024%, $\Delta_3\%$ in the range of about 0.08% to 0.20. The radii $r_1$, $r_2$, and $r_3$ are in the respective ranges of about, 3.0 microns to 3.8 microns, 5.7 microns to 12.05 microns, and 6.8 microns to 12.4 microns. The number of profiles which conform to these limits on $\Delta\%$ and radius is large without bound. It will thus be understood that it is not possible to investigate all of the profiles having parameters within these ranges. Also it will be understood that not all of the profiles, within the parameter ranges given, have the properties of the novel waveguide. However, sufficient modelling work has been done to prove that these disclosed ranges of profile parameters fairly describe the scope of the invention, as can be seen from Table 1 below which gives some ranges of waveguide fiber parameters investigated.

In a preferred embodiment of this first aspect of the invention, the profile parameters $\Delta_1\%$, $\Delta_2\%$, and $\Delta_3\%$ are about 0.73%, 0.012%, and 0.18% respectively, and $r_1$, $r_2$, and $r_3$ are about, 3.4 microns, 9.0 microns, and 9.6 microns respectively. These values may be regarded as center values of the profile parameters. That is, these profile parameters are an ideal starting point to begin investigating the allowed ranges of each parameter.

A second aspect of the invention is a subset of the first aspect. The family of refractive index profiles which belong to this subset have particularly attractive properties as a high performance waveguide which is relatively insensitive to manufacturing variations. The waveguide fiber of this second aspect has a three segment core refractive index profile. The index profile parameters ranges are defined as intervals about the center values defined in the preferred embodiment of the first aspect of the invention. In particular, for the family of novel refractive index profiles, $\Delta_1\%$ is 0.73% +/−0.05%, $\Delta_2\%$ is 0.12% +/−0.12%, $\Delta_3\%$ is 0.18% +/−10.05%, $r_1$ is 3.4 microns +/−0.4 microns, $r_2$ is 9.0 microns +/−3.0 microns, $r_3$ is 9.6 microns +/−2.8 microns, and r is 10.2 microns +/−3 microns.

This family of index profiles provides a waveguide fiber having mode field diameter greater than 8.3 microns, a bend loss less than 8 dB, and a positive total dispersion in the range of about 0.5 ps/fnm-km to 3.0 ps/nm-km, over the wavelength range 1530 nm to 1570 nm. Thus the waveguides of this subset have properties superior to those of the parent set defined in the first aspect of the invention.

It will be understood that waveguide fibers having index profile parameters which lie in respective ranges about twice those stated immediately above may have the properties of the subject novel waveguide fiber. Thus, the respective parameter limits given immediately above are believed to be conservative in terms of the number of sets of workable waveguide parameter sets contained therein.

An additional feature of this second aspect of the invention is the insensitivity of the waveguide fiber properties to variations in waveguide fiber profile due to manufacturing variations. The properties of the waveguide fiber were modelled under the constraint that all but one of the profile parameters was held at its center position. The remaining profile parameter was allowed to vary between its limits as defined in the second aspect of the invention.

Thus when $\Delta_1\%$ was allowed to vary by +/−0.05%, the properties of the waveguide fiber were calculated to be:

mode field diameter>8.3 microns;

pin array bend loss<7 dB;

$\lambda_c$ in the range of about 1390 nm to 1410 nm;

$\lambda_o$ in the range of about 1510 nm to 1515 nm; and, dispersion slope in the range of about 0.059 ps/nm$^2$–km to 0.061 ps/nm$^2$—km, over a wavelength range 1530 nm to 1570 nm.

When core radius r was allowed to vary by +/−0.08 microns, the properties of the waveguide fiber were calculated to be:

mode field diameter>8.3 microns;

pin array bend loss<8 dB;

$\lambda_c$ in the range of about 1380 nm to 1450 nm;

$\lambda_o$ in the range of about 1500 nm to 1525 nm; and, dispersion slope in the range of about 0.059 ps/nm$^2$—km to 0.061 ps/nm$^2$—km, over a wavelength range 1530 nm to 1570 nm.

When $\Delta_3\%$ was allowed to vary by +/−0.05%, the properties of the waveguide fiber were calculated to be:

mode field diameter>8.35 microns;

pin array bend loss<6 dB;

$\lambda_c$ in the range of about 1250 nm to 1550 nm;

$\lambda_o$ in the range of about 1500 nm to 1525 nm; and, dispersion slope in the range of about 0.059 ps/nm$^2$—km to 0.061 ps/nm$^2$—km, over a wavelength range 1530 nm to 1570 nm.

When $r_3$ was allowed to vary by +/−0.25 microns, the properties of the waveguide fiber were calculated to be:

mode field diameter>8.35 microns;

pin array bend loss<6 dB;

$\lambda_c$ the range of about 1350 nm to 1450 nm;

$\lambda_o$ in the range of about 1510 nm to 1513 nm; and, dispersion slope in the range of about 0.059 ps/nm$^2$—km to 0.061 ps/nm$^2$—km, over a wavelength range 1530 nm to 1570 nm.

It is contemplated that favorable interactions among the parameters, i.e., interactions wherein movement of one parameter cancels the negative result of movement of another parameter, will greatly increase the tolerance limits on the family of waveguide fibers described immediately above.

DETAILED DESCRIPTION OF THE INVENTION

The novel optical waveguide fiber described herein includes a core region having three segments. The segments are distinguished from each other by a refractive index profile characteristic of a given segment. The three segment core region provides sufficient flexibility of waveguide fiber design to accommodate a wide range of functional requirements. The parameters which may be changed to provide particular waveguide fiber performance are:

Δ% of each of the three regions;

radius of each of the three regions; and, index profile shape of each of the three regions.

The distinguishing properties of the novel waveguide fiber disclosed herein are: positive total dispersion, over a prescribed wavelength range, 1530 nm to 1570 nm, to counteract the SPM non-linear effect; very low dispersion slope over the prescribed wavelength range, to facilitate WDM operation; and, dispersion zero outside the prescribed wavelength to limit dispersion due to four wave mixing. The positive dispersion is typically less than 3 ps/nm/km which enables long unregenerated systems. Advantageously, the prescribed wavelength range essentially coincides with the peak gain curve of an erbium doped optical amplifier. Thus, the subject novel waveguide fiber is uniquely suited for systems which carry high bit rate or incorporate optical amplifiers or long regenerator spacing.

In addition, the core region design is simple, which means attenuation will be comparable to that of step index fiber and the manufacturing cost is maintained as low as possible.

Figure 4:
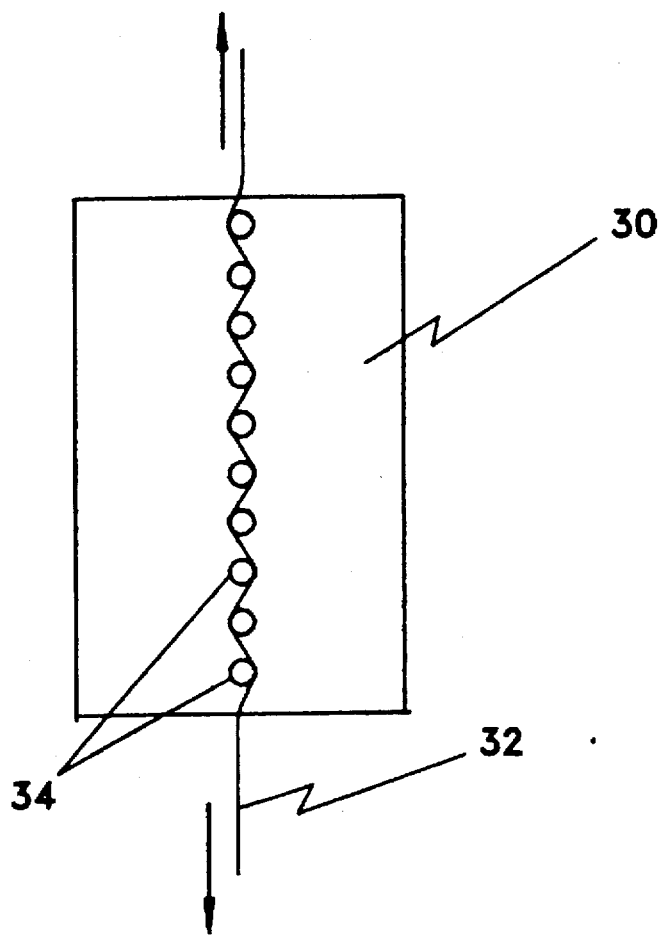
FIG. 4 is a schematic top view of the pin array bend test.

The excellent waveguide properties and performance include the same strength and fatigue performance as step index waveguide fiber. Furthermore, the bend resistance of the subject novel waveguide fiber is as good as or better than that of dispersion shifted waveguide fiber now available. The pin array bend test which confirms this statement of relative bend performance is shown in FIG. 4, which is a top view of the test apparatus along with a fiber in position for testing. Waveguide fiber 32 passes on alternating sides of pins 34. The pins are fixedly mounted on a substrate 32. The fiber is tensioned such that the fiber conforms to the shape of a portion of the pin surface.

Figure 1:
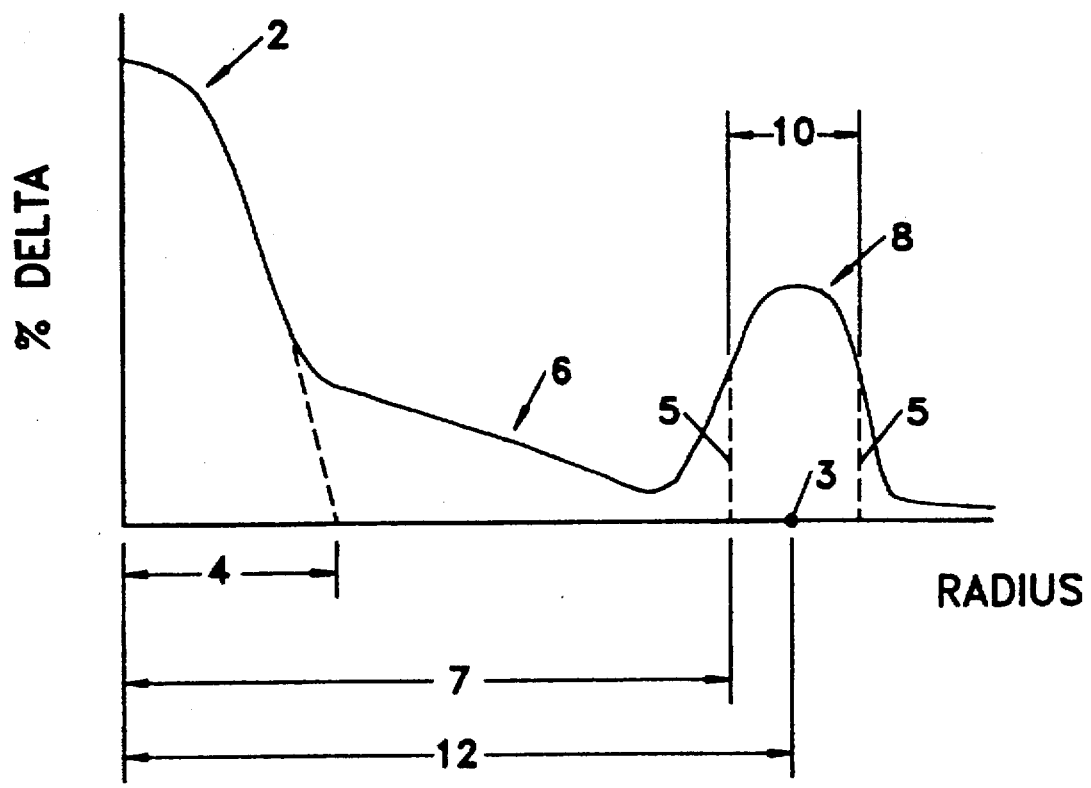
FIG. 1 is a general representation of a three segment core refractive index profile which shows the definitions of the index profile dimensions.

Referring to FIG. 1, the three core segments in which the profile can be adjusted are indicated as 2, 6, and 8. In each of the three segments, the index profile is defined by a particular refractive index at each radial point of the segment. The radial extent of each segment may be adjusted to obtain preferred waveguide fiber properties. As illustration, the radius of central core region 2 is shown as length 4. In this case, and for all modelled cases, the central core radius is measured from the axial centerline to the intersection of the extrapolated central profile with the x axis.

The first annular region 6 is delimited by the radius 4 and the radius 7, which extends to vertical line 5 drawn from the half width point of the second annular region. The characteristic radius of the second annular region 8 is chosen as length 12, which extends from the core center line to the midpoint of the base of segment 8, as indicated by point 3. This convention for second annulus radius is used in all modelled cases. A convenient profile measure for symmetrical profiles is the width 10 shown between vertical lines 5. Lines 5 depend from the half width points of segment 10. This convention for second annulus width is used in all modelled cases.

Example 1—Three Segment Positive Dispersion Waveguide Fiber

Figure 2:
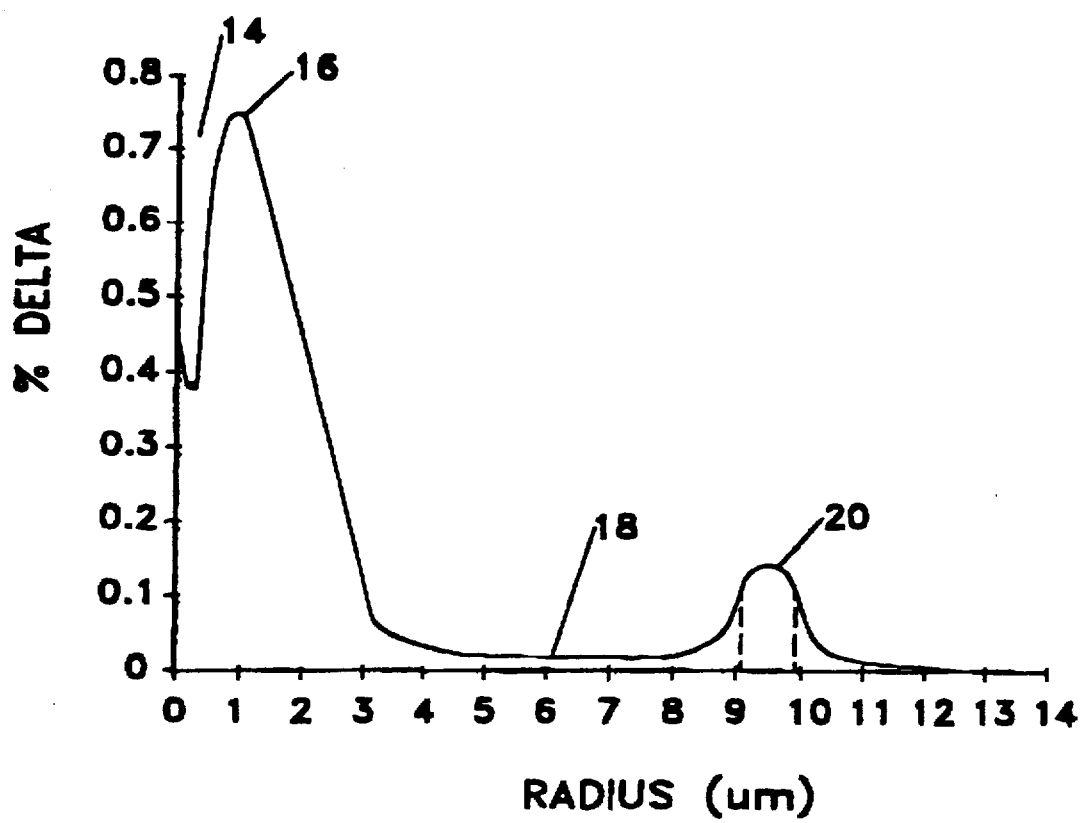
FIG. 2 is an example of the novel refractive index profile of this application.

A representative of a three segment core region refractive index profile is shown in FIG. 2. The centerline dip in the central index profile segment is due to diffusion of dopant from the waveguide fiber centerline during waveguide preform processing. The central segment is an alpha profile where alpha is about 1 and $\Delta_1$% is about 0.73%. The central radius is about 3.4 microns. The second segment is annulus 18 which has $\Delta_2$% near zero and inner and outer radii, 3.4 microns and 9 microns respectively. The third segment, 20, has a width of about 0.95 microns, a $\Delta_3$% of about 0.14%, and a radius to the midpoint of the segment of about 9.5 microns.

The predicted performance of this waveguide is:

$\lambda_o$=1551 nm;

dispersion slope=0.06 ps/nm$_2$—km;

mode field diameter=8.4 microns;

$\lambda_c$=1412 nm in fiber form and 1100 nm after cabling;

total dispersion in the range 1–3 ps/nm-km over the wavelength range 1530 nm to 1570 nm; and, pin array bend loss=5.6 dB, which compares favorably with the average 8 dB loss of negative dispersion three segment waveguides.

Note that the waveguide fiber of example 1 meets every criteria of a high performance single mode waveguide fiber designed for WDM, limited four wave mixing, reduced SPM, and use with erbium doped optical amplifiers.

The four charts, FIG. 3a, 3b, 3c, and 3d show the insensitivity of the novel waveguide fiber to variations in the core region parameters.

Example 2—Bend Loss and Mode Field Sensitivity

Figure 3A:
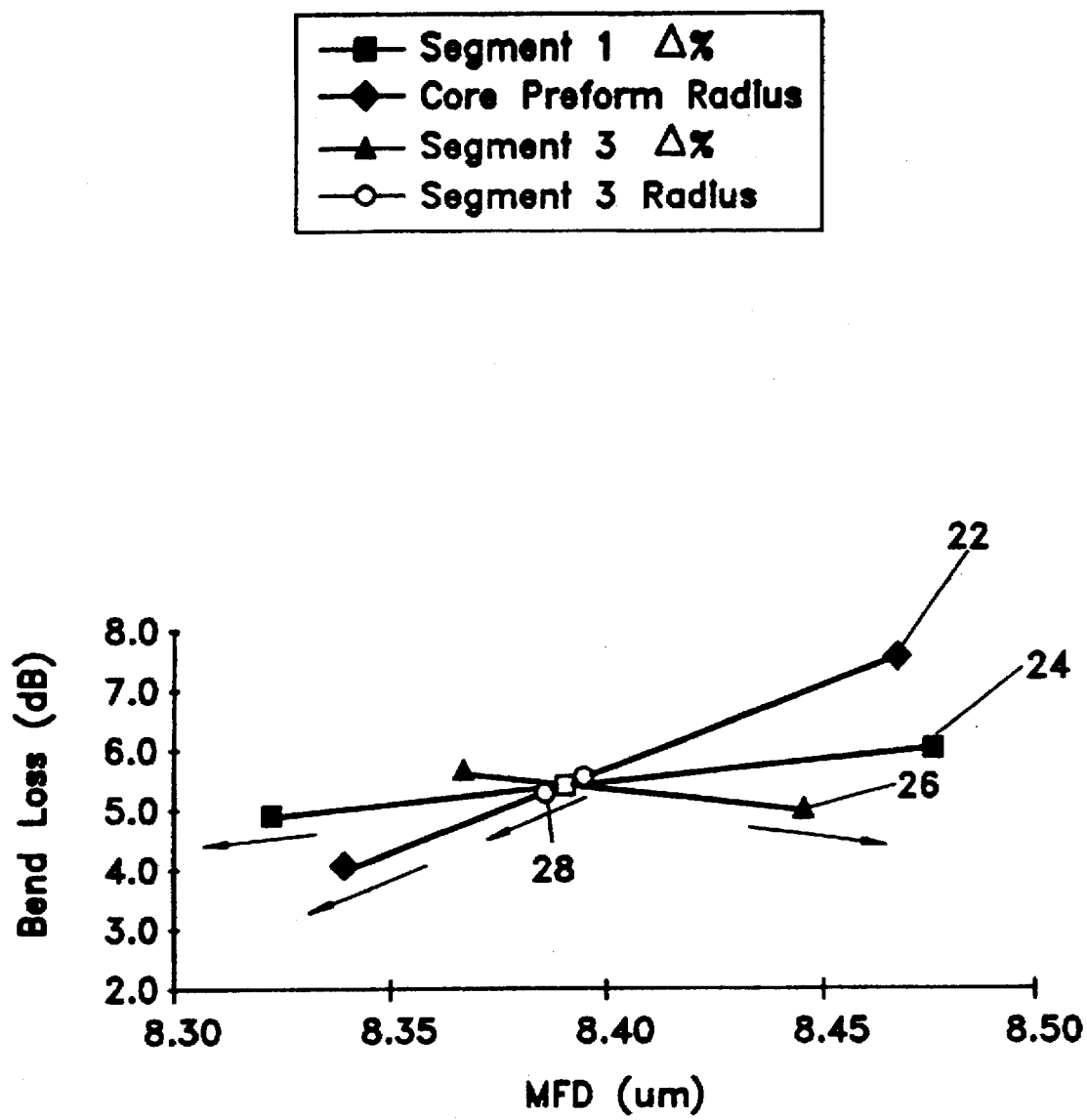
FIGS. 3a, 3b, 3c, and 3d show the sensitivity of waveguide fiber properties to changes in the refractive index profile parameters.

FIG. 3a is a chart of bend loss vs. mode field diameter wherein $\Delta_1$1%=0.73% is allowed to vary between limits +/−0.01Δ%. The radius of the core preform prior to draw is allowed to vary by an amount of about 2.5%, wherein the core preform radius prior to draw is generally in the range 3.5 mm–6 mm. This particular radius is chosen as a parameter because a variation in core preform radius can result in different relative spacing of the segments as well as differences in the segment radii. For the third segment, Δ3% is taken to be 0.18%+/−0.05%. The third segment radius is 9.6 microns+/−0.25 microns.

To generate curves 22, 24, 26, and 28 of FIG. 3a, three of the parameters are held at their midpoint while the fourth parameter is varied between its upper and lower limits. Thus, line 24, is found by calculating bend loss and mode field diameter when preform radius is 3.5 mm, $\Delta_3\%$ is 0.18%, $r_3$ is 9.6 microns, and $\Delta_1$ varies over the range 0.72% to 0.74%. Likewise, line 22 is found by calculating bend loss and mode field diameter when $\Delta_1\%$ is 0.73%, $\Delta_3\%$ is 0.18, $r_3$ is 9.6 microns, and preform radius varies over the range 3.5 microns +/−2.5%. Curves 26 and 28 are generated analogously and specific parameter values are 0.18% +/−0.05% for $\Delta_3\%$ and for $r_3$, 9.6 microns +/−0.25 microns.

It is extraordinary that the core region parameters may be varied, as described above, while bend loss remains below 8 dB and mode field diameter stays within the range 8.30 microns to 8.5 microns.

Table 1. shows the midpoint values of each of the core region index parameters and the ranges which define the family of novel profiles.

TABLE 1

| | $\Delta_1\%$ | $r_1$ | $\Delta_2\%$ | $\Delta_3\%$ | $r_3$ | Segment 3 Width |
|---|---|---|---|---|---|---|
| Average | 0.73% | 3.4 microns | 0.012% | 0.18% | 9.6 microns | 1.2 microns |
| Limits | +/−0.10% | +/−0.2 | +/.006% | +/−0.05% | +/−1.4 | +/−0.5 |

Example 2—Waveguide Cut Off and Mode Field Diameter

Figure 3B:
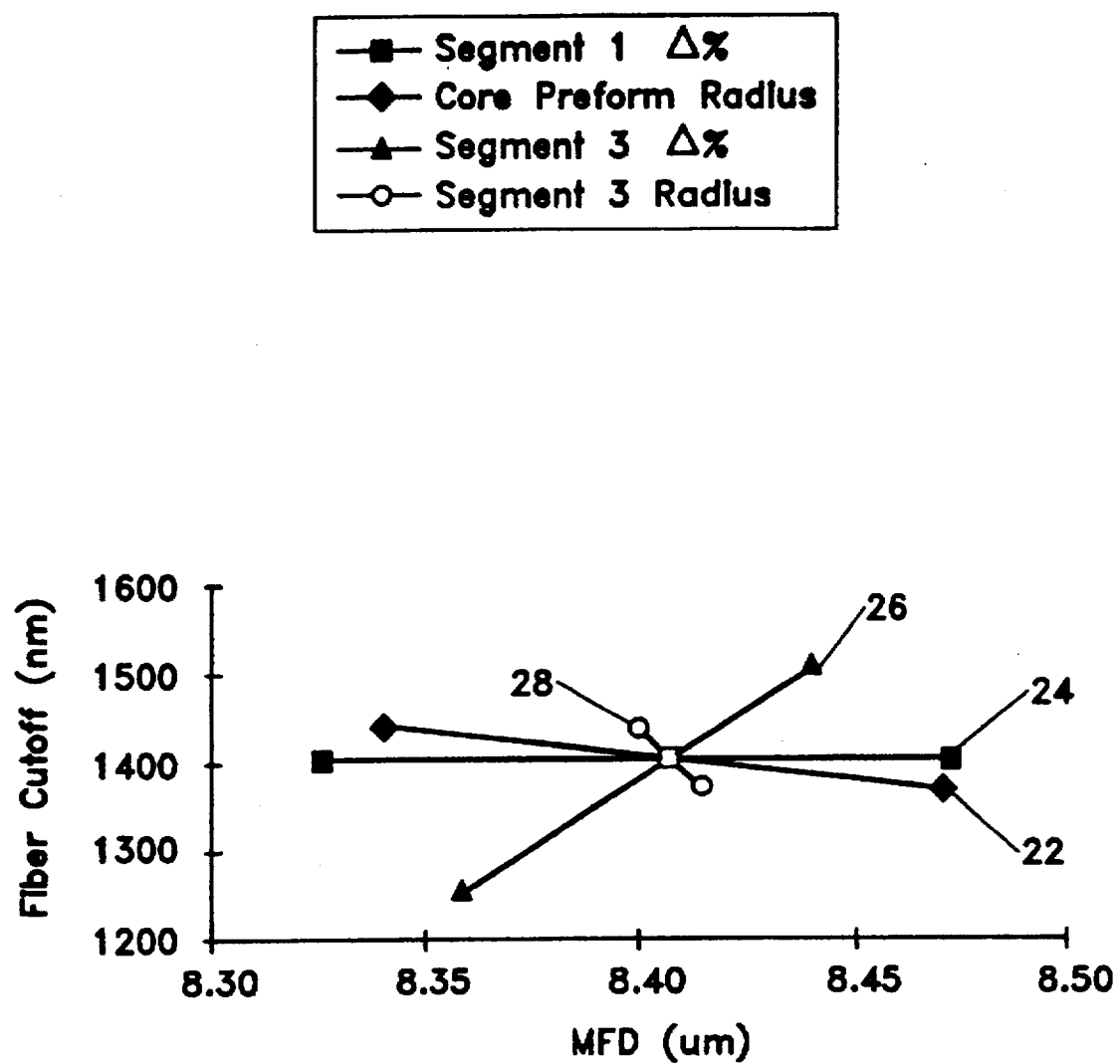

Referring to FIG. 3b, the four curves shown therein are generated in a manner analogous to the curves in FIG. 3a.

Note that for the stated variations in segment 1 delta, $\Delta_1\%$, in preform radius, and in $r_3$, the cut off wavelength lies in the very narrow range 1350 nm to 1450 nm. More variation in cut off is seen when preform radius varies over its prescribed range of about 3.5 mm+/−2.5%. Even in this case, however, the fiber is fully functional because the cabled cut off wavelength will be below about 1100 nm. In general, cabling causes the cut off wavelength to decrease by about 400 nm relative to the cut off wavelength measured for the waveguide fiber prior to any further processing.

The variation in mode field diameter is again confined to the narrow range, 8.30 microns to 8.5 microns.

Example 3—Zero Dispersion Wavelength and Mode Field Diameter

Figure 3C:
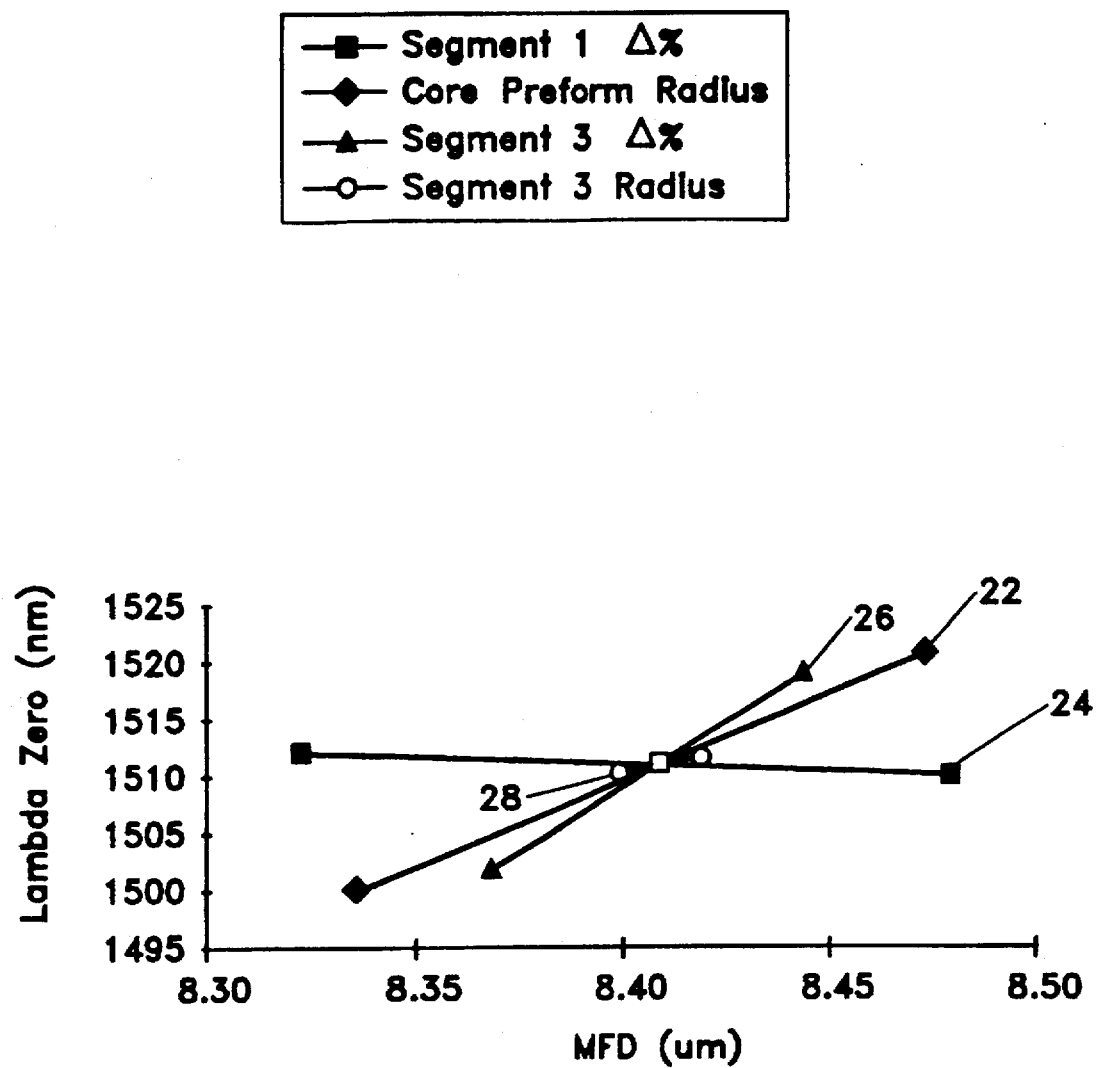

As in examples, 1 and 2 above, each of the four core region parameters are allowed to vary over the selected range of values. Referring to FIG. 3c, mode field diameter is in the range 8.3 microns to 8.5 microns and zero dispersion wavelength, $\lambda_o$, is advantageously confined to the range of about 1500 nm to 1520 nm. Thus, for relatively large variations in the parameters of the novel waveguide fiber core region, $\lambda_o$ remains outside the WDM region which coincides with the peak gain range of an erbium doped optical amplifier, i.e., 1530 nm to 1570 nm.

Example 4—Total Dispersion Slope and Mode Field Diameter

Figure 3D:
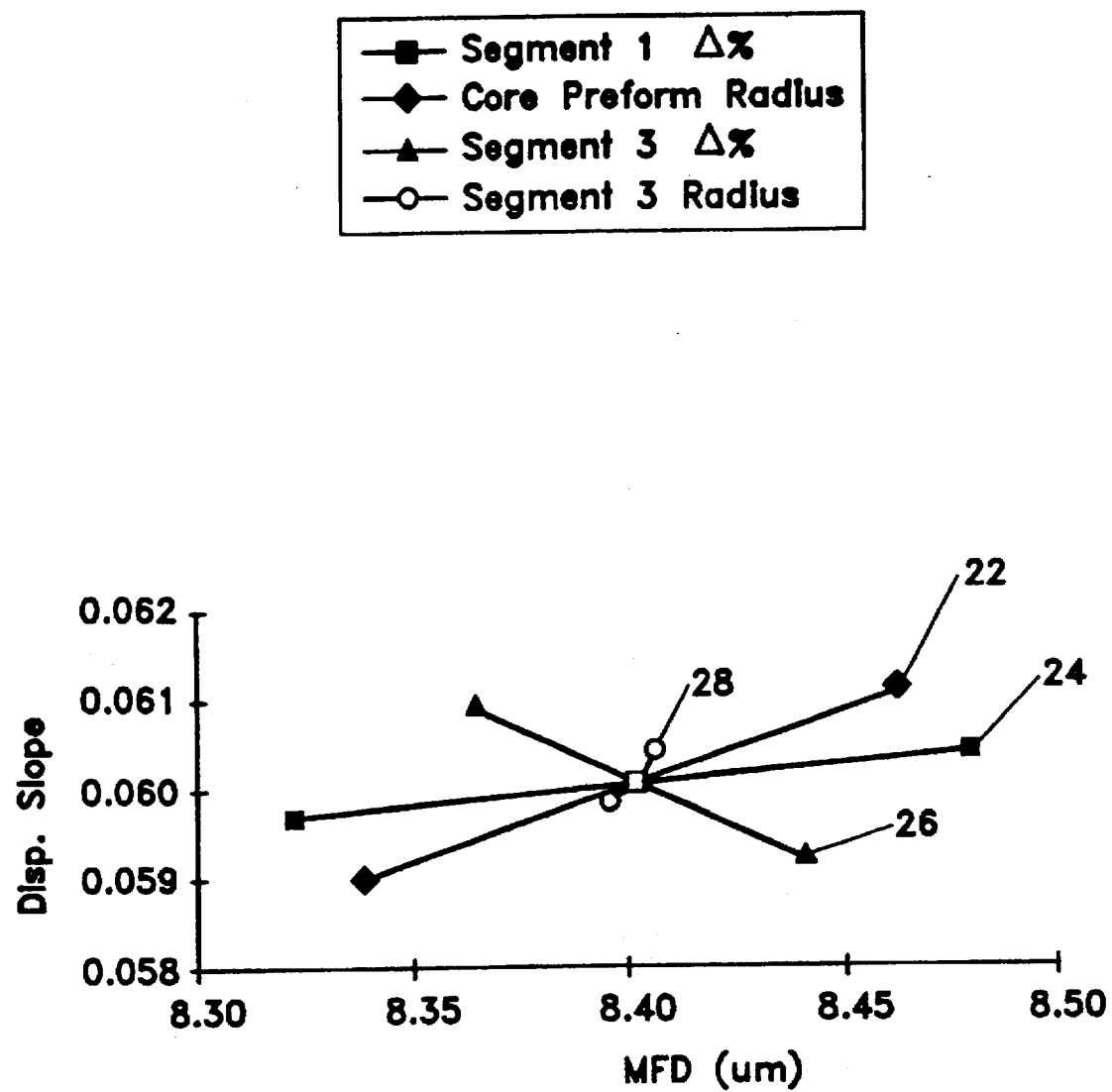

As is shown in FIG. 3d, mode field is in the range 8.3 microns to 8.5 microns and total dispersion slope lies in the narrow range 0.059 to 0.061 ps/nm²—km, when the core parameters are taken through their respective ranges of variation.

Viewing the four charts, FIG. 3a, 3b, 3c, and 3d together the insensitivity of the mode field diameter to the prescribed variation of $r_3$ is remarkable. Also, the four parameters studied in these examples are seen to have about equal impact on the variation in dispersion slope. The clustering of points in the sensitivity charts of FIG. 3 strongly shows the ease of manufacture of the novel positive dispersion core region design.

We anticipate even greater flexibility in terms of manufacturing tolerance on key core region parameters. We know that the parameters interact and thus, we contemplate the effect of the variation of one parameter cancelling the effect of the variation of another parameter. Thus, the study of the parameter variations in pairs or in sets of three or more is contemplated, thereby defining a much broader family of core designs which yield positive dispersion over the key wavelength range as well as those properties characteristic of a high performance waveguide fiber.

Although particular embodiments of the invention have hereinbefore been disclosed and described, the scope of the invention is nevertheless limited only by the following claims.

What is claimed is:

1. A single mode optical waveguide fiber comprising:

a core region having a refractive index profile including three segments, a first central segment having a maximum refractive index $n_1$, an index difference $\lambda_1\%$, and a radius $a_1$ measured from a point on the longitudinal axis of symmetry of said waveguide fiber, said central segment disposed substantially symmetrically about the longitudinal axis of symmetry, a second segment, of annular shape disposed adjacent and around said central segment, having a maximum refractive index $n_2$, an index difference $\Delta_2\%$, and an outside radius $r_2$, a third segment, of annular shape disposed adjacent and around said second segment, having a maximum refractive index $n_3$, an index difference $\Delta_3\%$, and a radius to the midpoint of said third segment $r_3$;

a clad layer, of annular shape disposed adjacent and around said third segment, having a maximum refractive index $n_c$;

wherein, $n_1>n_3>n_2 \geq n_c$, said central segment has an alpha refractive index profile and alpha is about 1, said second segment has a substantially flat refractive index profile, and said third segment has a rounded step index profile, $\Delta_1\% \leq 0.9\%$, $\Delta_2\% \leq 0.024\%$, and $\Delta_3\% \leq 0.2\%$, and the radii, $r_1$, $r_2$, and $r_3$ are chosen to provide an optical waveguide fiber characterized by, $\lambda_o \leq 1530$ nm, total dispersion slope<0.065 ps/nm₂—km over the range 1530 nm to 1570 nm, pin array bend loss <12 dB, mode field diameter $\leq 7.4$ microns, $\lambda_c<1450$, and total dispersion which is in the range of about 0.5 ps/nm-km to 3 ps/nm-km over wavelength range 1530 nm to 1570 nm.

2. The single mode optical waveguide of claim 1 wherein $\Delta_1\%$, $\Delta_2\%$, and $\Delta_3\%$ are in the respective ranges of about 0.57% to 0.90%, 0 to 0.24%, and 0.08% to 0.20%, and $r_1$, $r_2$, and $r_3$ are in the respective ranges of about, 3.0 to 3.8 microns, 5.7 to 12.05 microns, and 6.8 to 12.4 microns.

3. The single mode optical waveguide of claim 1 wherein $\Delta_1\%$, $\Delta_2\%$, and $\Delta_3\%$ are about 0.73%, 0.012%, and 0.18% respectively, and $r_1$, $r_2$, and $r_3$ are about, 3.4 microns, 9.0 microns, and 9.6 microns respectively.

4. A single mode optical waveguide fiber comprising:

a core region having a radius r, and a refractive index profile including three segments, a first central segment having a maximum refractive index $n_1$, an index difference $\Delta_1\%$, and a radius $a_1$ measured from a point on the longitudinal axis of symmetry of said waveguide fiber, said central segment disposed substantially symmetrically about the longitudinal axis of symmetry, a second segment, of annular shape disposed adjacent and around said central segment, having a maximum refractive index $n_2$, an index difference $\Delta_2\%$, and an outside radius $r_2$, a third segment, of annular shape disposed adjacent and around said second segment, having a maximum refractive index $n_3$, an index difference $\Delta_3\%$, and a radius to the midpoint of said third segment $r_3$;

a clad layer, of annular shape disposed adjacent and around said third segment, having a maximum refractive index $n_c$;

wherein, $n_1 > n_3 > n_2 \geq n_c$, said central segment has an alpha refractive index profile and alpha is about 1, said second segment has a substantially flat refractive index profile, and said third segment has a rounded step index profile, and $\Delta_1\%$ is 0.73% +/−0.05%, $\Delta_2\%$ is 0.012% +/−0.012%, $\Delta_3\%$ is 0.18% +/−0.05%, $r_1$ is 3.4 microns +/−0.4 microns, $r_2$ is 9.0 microns +/−3.0 microns, $r_3$ is 9.6 microns +/−2.8 microns, and r is 10.2 microns +/−3 microns, to provide a waveguide fiber having a mode field diameter greater than 8.3 microns, a bend loss less than 8 dB, and a positive total dispersion in the range of about 0.5 ps/nm-km to 3 ps/nm-km over a wavelength range 1530 nm to 1570 nm.

5. The single mode optical waveguide of claim 4 wherein the refractive index profile of said core region has parameters substantially centered on the respective tolerance intervals except $\Delta_1\%$ which has a value anywhere in its tolerance interval, said optical waveguide has mode field diameter>8.30 microns, bend loss <7 dB, $\lambda_o$ in the range of about 1390 nm to 1410 nm, $\lambda_o$ in the range of about 1510 nm to 1515 nm, and a dispersion slope in the range of about 0.059 ps/nm²—km to 0.061 ps/nm²—km over a wavelength range 1530 nm to 1570 nm.

6. The single mode optical waveguide of claim 4 wherein the refractive index profile of said core region has parameters substantially centered on the respective tolerance intervals except r which has a value anywhere in its tolerance interval, said optical waveguide has mode field diameter>8.30 microns, bend loss <8 dB, $\lambda_c$, in the range of about 1380 nm to 1450 nm, $\lambda_o$ in the range of about 1500 nm to 1525 nm, and a dispersion slope in the range of about 0.059 psfnm²—km to 0.061 ps/nm²—km over a wavelength range 1530 nm to 1570 nm.

7. The single mode optical waveguide of claim 4 wherein the refractive index profile of said core region has parameters substantially centered on the respective tolerance intervals except $\Delta_3\%$ which has a value anywhere in its tolerance interval, said optical waveguide has mode field diameter>8.35 microns, bend loss<6 dB, $\lambda_c$ in the range of about 1250 nm to 1550 nm, $\lambda_o$ in the range of about 1500 nm to 1525 nm, and a dispersion slope in the range of about 0.059 ps/nm²—km to 0.061 ps/nm²—km over a wavelength range 1530 nm to 1570 nm.

8. The single mode optical waveguide of claim 4 wherein the refractive index profile of said core region has parameters substantially centered on the respective tolerance intervals except $r_3$ which has a value anywhere in its tolerance interval, said optical waveguide has mode field diameter>8.35 microns, bend loss <6 dB, $\lambda_c$ in the range of about 1350 nm to 1450 nm, $\lambda_o$ in the range of about 1510 nm to 1513 nm, and a dispersion slope>0.059 ps/nm²—km and<0.061 ps/nm²—km over a wavelength range 1530 nm to 1570 nm.

* * * * *

UNITED STATES PATENT AND TRADEMARK OFFICE
CERTIFICATE OF CORRECTION

PATENT NO. : 5,748,824
DATED : May 5, 1998
INVENTOR(S) : David K. Smith

It is certified that error appears in the above-identified patent and that said Letters Patent is hereby corrected as shown below:

Col. 2, line 42, "%delta(r)=%delta($r_0$,)(1-[(r-$r_0$)/($r_1$-$r_0$)]$^{alpha}$)," should be --%delta(r)=%delta($r_0$)(1-[(r-$r_0$)/($r_1$-$r_0$)]$^{alpha}$),--

Col. 3, line 22, "$n_1 > n_3 > n_2 \geq n \geq n_c$" should be -- $n_1 > n_3 > n_2 \geq n_c$ --

Col. 3, line 31, "pin array bend loss $\geq$ 12 dB;" should be --pin array bend loss < 12 dB;--

Col. 3, line 32, "mode field diameter $\leq$ 7.4 microns;" should be --mode field diameter $\geq$ 7.4 microns;--

Col. 4, lines 8-9, "$\Delta_3$% is 0.18% +/- 10.05%" should be --$\Delta_3$% is 0.18% +/- 0.05%--

Col. 4, line 15, "0.5 ps/fnm-km" should be --0.5 ps/nm-km--

Col. 4, line 59, "$\lambda_o$ in the range of about 1250 nm to 1550 nm;" should be --$\lambda_c$ in the range of about 1250 nm to 1550 nm;--

UNITED STATES PATENT AND TRADEMARK OFFICE
CERTIFICATE OF CORRECTION

PATENT NO. : 5,748,824
DATED : May 5, 1998
INVENTOR(S) : David K. Smith

It is certified that error appears in the above-identified patent and that said Letters Patent is hereby corrected as shown below:

Col. 6, line 63, "$\Delta 3\%$" should be --$\Delta_3\%$--

Col. 8, line 20, "$\lambda_1\%$" should be --$\Delta_1\%$--

Col. 8, line 45, "$\leq$ 7.4 microns" should be --$\geq$ 7.4 microns--

Col. 9, line 30, "$\lambda_o$" should be --$\lambda_c$--

Col. 10, lines 8-9, "0.059 psfnm²" should be --0.059 ps/nm²--

Signed and Sealed this

Nineteenth Day of January, 1999

Attest:

Attesting Officer

*Acting Commissioner of Patents and Trademarks*